United States Patent [19]
Onoe et al.

[11] Patent Number: 5,624,515
[45] Date of Patent: Apr. 29, 1997

[54] METHOD OF PRODUCING SHORT FIBERS

[75] Inventors: Susumu Onoe; Kanji Kimoto; Keizou Nonaka; Hiroshi Matsuoka, all of Kobe, Japan

[73] Assignee: Bando Chemical Industries, Ltd., Kobe, Japan

[21] Appl. No.: 460,427

[22] Filed: Jun. 2, 1995

[30] Foreign Application Priority Data

Jun. 6, 1994 [JP] Japan .................................... 6-123833

[51] Int. Cl.⁶ ............................ D02G 1/20; D03D 25/00; F16G 5/08
[52] U.S. Cl. ........................ 156/148; 156/137; 156/142; 156/305; 264/103
[58] Field of Search ........................ 156/148, 624, 156/251, 296, 305, 84, 142; 264/115, 103; 474/263

[56] References Cited

FOREIGN PATENT DOCUMENTS 3287827  12/1991  Japan .
4146221   5/1992  Japan .

*Primary Examiner*—Daniel Stemmer
*Attorney, Agent, or Firm*—Sixbey Friedman Leedom & Ferguson; Gerald J. Ferguson, Jr.; Thomas W. Cole

[57] ABSTRACT

A multi-filament yarn is subjected to soft twist of 4 to 9 twistings in every 10 cm in a single direction thereby forming a warp yarn. Weft yarns are passed, at a density of 1 to 3 yarns in every 5 cm, crosswise over and under a plurality of the warp yarns parallel-arranged in a set width, thereby forming a cord fabric. The cord fabric is subjected to adhesion treatment with an adhesive so that an adhesive content per unit area thereof reaches 2 to 5%, is subjected to heat treatment so that the warp yarns reaches 1 to 4% in heat shrinkage percentage and is then cut at set lengths thereby obtaining short fibers.

5 Claims, 2 Drawing Sheets

METHOD OF PRODUCING SHORT FIBERS

BACKGROUND OF THE INVENTION

This invention relates to a method of producing short fibers whereby there can be obtained short fibers of uniform length suitable for reinforcing rubber.

In general, short fibers are mixed into a rubber product such as a power transmission belt in which its body as a main portion is made of rubber, in order to reinforce the body. Conventionally, there have been various methods of producing short fibers, such as:

(a) a method in which one hundred thousand to one million denier of tow-shaped fibers are subjected to adhesion treatment and are then cut at set lengths thereby obtaining short fibers, as disclosed in the Japanese Patent Application Laid-Open Gazette No.4-146221;

(b) a method in which one thousand to ten thousand denier of rope-shaped fibers are subjected to adhesion treatment and are then cut at set lengths thereby obtaining short fibers; and (c) a method in which a cord fabric is formed by use of spun yarns or blended yarns as warp yarns, is subjected to adhesion treatment and is then cut at set lengths thereby obtaining short fibers, as disclosed in the Japanese Patent Application Laid-Open Gazette No.3-287827.

However, short fibers obtained by the above conventional method (a) have many variations in length, so that when they are mixed into rubber their dispersibility is poor. Further, when a body of a power transmission belt is formed of the rubber into which the short fibers are mixed, cracks readily generate at the interface between the short fibers and the rubber thereby inviting the end of the belt life at an early stage.

In the conventional method (b), since a bundle of fibers is rope-shaped, it is hard to be impregnated with an adhesive. This reduces productivity thereby increasing the cost.

In the conventional method (c), since each filament forming the warp yarn of the cord fabric is a spun yarn or blended yarn and is primary-twisted and final-twisted with a strong force, the filament cannot uniformly be impregnated to the inside with an adhesive. Accordingly, after the cord fabric is cut, a large amount of filaments remain without being subjected to adhesion treatment.

Further, in the above method using a cord fabric, a direction of weft yarns passed crosswise over and under warp yarns is equal to a direction to be cut of the warp yarns, so that when the cord fabric is cut, the weft yarns are not cut in a short length to remain long unlike the warp yarns. When these long weft yarns are mixed into rubber, they become foreign substances thereby inviting generation of cracks. Accordingly, it is required that the count of the weft yarns is as small as possible.

Furthermore, in the case that a heat shrinkage percentage of short fiber is too large, when short fibers and rubber are mixed and then vulcanized, distortions are generated at the interfaces between the short fibers and the rubber thereby reducing the rubber in abrasion resistance. On the contrary, in the case that the heat shrinkage percentage of short fiber is too small, the tension at the adhesion treatment is considerably reduced thereby presenting poor workabilities.

In addition, in the case that an adhesive content per unit area of the cord fabric at the adhesion treatment is too large, when the short fibers are mixed into the rubber, they are difficult to disperse in the rubber thereby inviting a poor dispersibility of short fibers. On the contrary, in the case that an adhesive content per unit area of the cord fabric at the adhesion treatment is too small, the short fibers and the rubber cannot be integrated thereby reducing the rubber in abrasion resistance.

The present invention employs a method of producing short fibers from a cord fabric. It is an object of the present invention to uniformly cut warp yarns in a set length so as to generate no foreign substance by specifying material of filament forming the warp yarn, a twisting manner of filament, a heat shrinkage percentage of warp yarn, a density of weft yarns and an adhesive content per unit area of a cord fabric, and thus to prevent a poor dispersibility of cut short fibers into rubber and a generation of cracks in a transmission belt using the short fibers.

It is another object of the present invention to enhance an impregnating ability of an adhesive into warp yarns thereby eliminating nonuniformity in impregnation and to enhance productivity.

It is still another object of the present invention to improve an abrasion resistance of rubber depending on a heat shrinkage percentage of short fiber and depending on an adhesive content per unit area of a cord fabric.

SUMMARY OF THE INVENTION

To attain the above objects, in a method of producing short fibers according to the present invention, a multi-filament yarn is subjected to soft twist of a set number of twistings in a single direction thereby forming a warp yarn. Subsequently, a plurality of the warp yarns are parallel-arranged in a set width and in this state weft yarns are passed crosswise over and under the warp yarns at a set density thereby forming a cord fabric. Thereafter, the cord fabric is subjected to adhesion treatment with an adhesive so as to reach a set adhesive content per unit area and is subjected to heat treatment so as to have the warp yarns of a set heat shrinkage percentage, and then the cord fabric is cut at set lengths thereby obtaining short fibers.

Under the above structure, since the warp yarns forming the cord fabric are multi-filament yarns each of which has continuity without interruption, short fibers obtained by cutting the multi-filament yarn are uniform in length to uniformly disperse into the rubber, unlike the conventional method in which a spun yarn or a blended yarn each formed of collected short fibers is cut so that short fibers thus obtained have variations in length. In addition, since the warp yarn is subjected to soft twist of a suitable number of twistings in a single direction, they are easy to be impregnated with the adhesive so that nonuniformity in impregnation is eliminated thereby enhancing productivity.

It is preferable that the number of twistings of the above multi-filament yarn is soft twist of 4 to 9 times in every 10 cm.

The count (density) of the weft yarns in forming the cord fabric is preferably 1 to 3 yarns in every 5 cm. Since this count is suitable as the density of the weft yarns, the weft yarns can be prevented from remaining long in the form of foreign substances when they are cut, so that no crack generates in the rubber mixed with the weft yarns.

Further, the adhesion treatment of the cord fabric is preferably subjected so that an adhesive content per unit area of the cord fabric is within 2 to 5%. According to this, the cord fabric is subjected to adhesion treatment with a suitable amount of adhesive, so that cut short fibers can be readily dispersed into the rubber thereby increasing their dispersibility and the short fibers and the rubber can be integrated thereby increasing the rubber in abrasion resistance.

The adhesion treatment of the cord fabric is preferably dip treatment in which the cord fabric is dipped into a mixed solution of a resorcine-formaldehyde precondensate and rubber latex.

The heat shrinkage percentage of warp yarn is preferably 1 to 4%. Since this ratio leads to a suitable heat shrinkage percentage of short fiber, no distortion generates at the interfaces between the rubber and the short fibers when the rubber mixed with the short fibers is vulcanized. This can increase the rubber in abrasion resistance and secure a suitable tension at the adhesion treatment to increase workabilities.

In order to obtain short fibers by cutting at set lengths the cord fabric after subjected to adhesion treatment, the cord fabric is preferably cut by a cutter with rolled in the form of a cylinder.

DESCRIPTION OF PREFERRED EMBODIMENT

Description is made below about a method of producing short fibers used for reinforcing rubber according to an embodiment of the present invention, with reference to the drawings.

Figure 1:
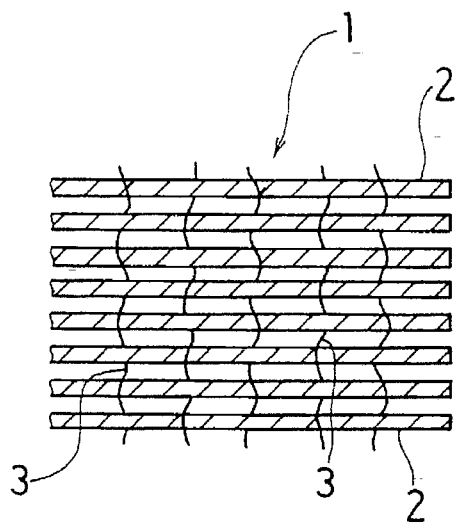
FIG. 1 is a diagram showing one of steps of a method of producing short fibers, in which a cord fabric is formed.

First, a cord fabric 1 as shown in FIG. 1 is formed.

The cord fabric 1 is so formed that a plurality of warp yarns 2, 2, ... are parallel-arranged in a set width and in this state weft yarns 3, 3, ... are passed crosswise over and under the warp yarns 2 in such a manner as to be fed in a longitudinal direction of the warp yarn 2. The warp yarn 2 is formed of a multi-filament yarn made of synthetic fiber such as aromatic nylon fiber, aliphatic nylon fiber, polyester fiber and vinyl on fiber or made of inorganic fiber such as carbon fiber. The multi-filament yarn has a structure easy to be twisted in such a form as a twist yarn of two multi-filament yarns of 840 de (denier).

Further, the warp yarn 2 is so formed that the multi-filament yarn is subjected to soft twist of a set number of twistings in a single direction. The number of twistings in the soft twist is set to 4 to 9 times in every 10 cm. The reason for this setting is as follows. That is, if the number of twistings is less than 4 times in every 10 cm, troubles can easily occur in forming the cord fabric. On the other hand, if the number of twistings is more than 9 times in every 10 cm, while the workability of forming the cord fabric can be increased, an adhesive at adhesion treatment is attached only to the surfaces of the warp yarns 2 so that the warp yarns 2 are difficult to be impregnated to the inside thereof with the adhesive, and even if the cord fabric is cut at set lengths into short fibers, the short fibers are difficult to separate so that the dispersibility of the short fibers into a rubber is poor and these non-separating short fibers act as foreign substances in the rubber thereby decreasing properties of the rubber.

The weft yarns 3 may be passed crosswise over and under the warp yarns 2 at a minimum density (count) capable of forming a cord fabric and conducting adhesion treatment, preferably at a density of 1 to 3 yarns in every 5 cm. The reason for this setting of the density is as follows. That is, if the density of the weft yarns 3 is less than 1 yarn in every 5 cm, the cord fabric is difficult to be formed and cracks generate at the adhesion treatment thereby making many troubles. On the other hand, if the density of the weft yarns 3 is more than 3 yarns in every 5 cm, short fibers obtained by cutting the weft yarns 3 include a large amount of foreign substances. It is unsuitable to mix such short fibers into the rubber. In other words, since the direction of the weft yarns 3 is equal to the direction to be cut of the warp yarn 2, the weft yarns 3 cannot be cut in a short length to remain long unlike the warp yarns 2, so that these long weft yarns 3 act as foreign substances thereby inviting cracks of the rubber.

Next, the cord fabric 1 formed as above-mentioned is subjected to adhesion treatment.

At the adhesion treatment, an adhesive content per unit area of the cord fabric 1 is set to 2 to 5%. The reason for this setting is that if the adhesive content per unit area is less than 2%, a bundle of multi filament yarns is not sufficiently fixed at the cutting of the cord fabric 1 so that a cutter is displaced thereby generating variations in cut length and the short fibers becomes poor in dispersibility and easy to be collected in the rubber. Further, the lack of adhesive strength decreases an effect of reinforcing the rubber thereby accelerating the tendency to generate cracks at the belt run. On the other hand, if the adhesive content per unit area is more than 5%, multi-filament yarns are excessively collected as difficult to separate, thereby decreasing the dispersibility of cut fibers in the rubber.

The above adhesion treatment is so-called dip treatment in which the cord fabric 1 is dipped into an RFL liquid as a mixed solution of a resorcine-formaldehyde precondensate and rubber latex.

The compounding of the RFL liquid is generally conducted in such a manner that resorcine and formaldehyde are reacted at an initial mole ratio within the range of 1.0/1.0 to 1.0/3.0 through basic catalyst and the resulting resorcine-formaldehyde precondensate and rubber latex are mixed so as to be 10/100 to 30/100 in weight ratio therebetween.

There can be used as the rubber latex the same type one as common adhesion rubber. For example, when the adhesion rubber is natural rubber or styrene-butadiene copolymer rubber, vinylpyridine-styrene-butadiene terpolymer rubber latex, styrene-butadiene copolymer rubber latex or natural rubber latex is used. When the adhesion rubber is chloroprene rubber, chloroprene rubber latex may be used besides the aforementioned types of rubber latex. However, rubber latex applicable for the present invention is not limited to the above types of rubber latex.

Furthermore, the warp yarns 2 are subjected to heat treatment so that the heat shrinkage percentage becomes 1 to 4%. The reason for this is as follows. That is, if the heat shrinkage percentage is less than 1%, it is necessary to considerably decrease a tension at the adhesion treatment. This easily makes troubles. On the other hand, if the heat shrinkage percentage is more than 4%, distortions are generated at the interfaces between rubber and the short fibers mixed into the rubber so that the rubber is decreased in abrasion resistance.

Figure 2:
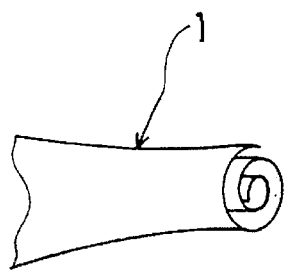
FIG. 2 is a diagram showing another step of the method of producing short fibers, in which the cord fabric is rolled like a cylinder before it is cut.
Figure 3:
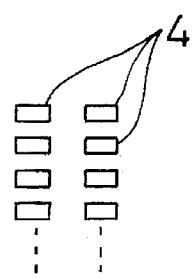
FIG. 3 is a diagram showing another step of the method of producing short fibers, in which the cord fabric is cut into short fibers.

Thereafter, as shown in FIG. 2, the cord fabric 1 after subjected to adhesion treatment is rolled in the form of a cylinder. Then, as shown in FIG. 3, the rolled cord fabric 1 is cut at set lengths by a cutter thereby obtaining short fibers 4 as cut fibers.

The short fibers 4 thus obtained are mixed into rubber thereby reinforcing a rubber product formed of the rubber.

Description is made next about specific examples of belts formed by the above method.

Table 1 shows respective structures of the above-mentioned cord fabric 1 of the present invention and various kinds of cord fabrics 1 as comparative examples, respective physical properties and workabilities of the above cord fabrics 1, and evaluations in running life of belts formed by use of respective types of rubber mixed with short fibers 4 obtained from the above cord fabrics 1. In Comparative example 1, the warp yarns 2 of the cord fabric 1 are not multi-filament yarns but spun yarns.

Figure 4:
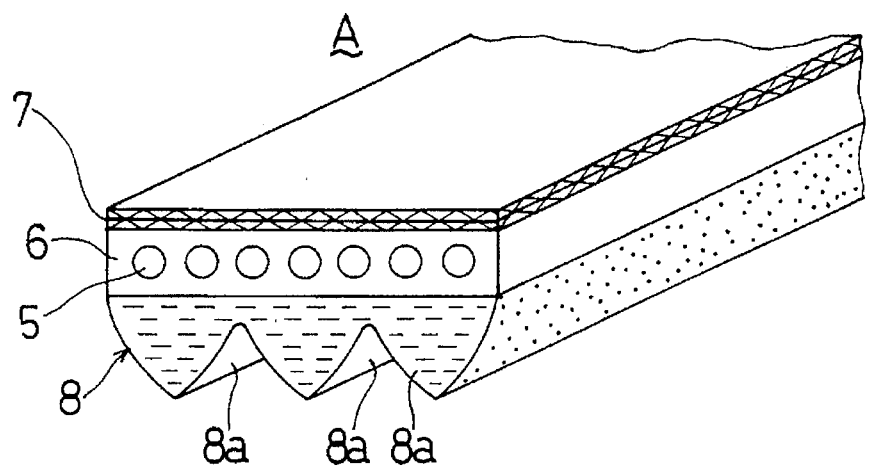
FIG. 4 is a perspective view showing a part of a V-ribbed belt.

The belts used for evaluation about running life are V-ribbed belts A as shown in FIG. 4. The V-ribbed belt A includes an adhesion rubber layer 6 into which cords 5, 5 . . . each formed of a polyester-fiber rope are embedded. The adhesion rubber layer 6 is integrally covered at the upper surface with a rubber-attached cotton fabric and is integrally formed at the lower surface with a compression rubber layer 8 having three ribs 8a, 8a, 8a extending in a longitudinal direction of belt. The V-ribbed belt A is a K-type three-ribbed belt having a 975 mm length according to the Rubber Manufactures Association (RMA) Standard. The belt also has a rib pitch of 3.56 mm, a rib height of 2.9 mm, a belt thickness of 5.3 mm and a rib angle of 40°. The compounding of the compression rubber layer 8 of the V-ribbed belt A is shown in Table 2.

Figure 5:
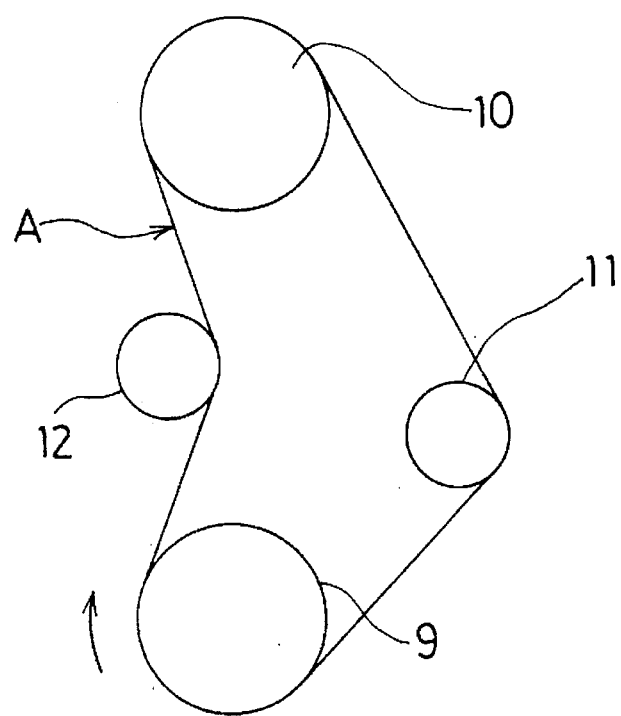
FIG. 5 is a schematic diagram of a tester for testing flex fatigue resistance.

Out of evaluation items about running life of belts, a flex fatigue resistance test was conducted as follows. As shown in FIG. 5, the V-ribbed belt A was looped over a driving pulley 9 having a 120 mm diameter, a driven pulley 10 of a 120 mm diameter, an idler pulley 11 of a 55 mm diameter and a back-face-side idler pulley 12 of a 70 mm diameter. The V-ribbed belt A was run among the pulleys 9–12 under the conditions that an initial tension of belt was 85 kgf, the number of rotations of the driving pulley 9 was 4900 rpm, a load applied to the driven pulley 10 was 16 PS and an ambient temperature was 85° C., and then the time until cracks generated at the rib 8a was measured.

The evaluation about abrasion resistance is made from the state of the belt side surface in the above flex fatigue resistance test.

TABLE 1

|  | Present Invention | Comparative Examples |  |  |  |  |  |  |  |
|---|---|---|---|---|---|---|---|---|---|
|  |  | 1 | 2 | 3 | 4 | 5 | 6 | 7 | 8 |
| Structure of Cord Fabric Warp Yarn |  |  |  |  |  |  |  |  |  |
| Structure | 840de/2 | ← | ← | ← | ← | ← | ← | ← | ← |
| Number of Twistings (times/10 cm) | 5 | 36 | 5 | 5 | 10 | 5 | 5 | 5 | 5 |
| Density (yarns/5 cm) | 52 | 57 | 52 | 52 | 52 | 52 | 52 | 52 | 52 |
| Weft Yarn |  |  |  |  |  |  |  |  |  |
| Density (yarns/5 cm) | 3 | 5 | 0.5 | 10 | 3 | 3 | 3 | 3 | 3 |
| Workability |  |  |  |  |  |  |  |  |  |
| Formation of Cord Fabric | G | G | P | E | G | G | G | G | G |
| Heat Treatment | G | G | P | G | G | E | P | G | G |
| Property of Warp Yarn |  |  |  |  |  |  |  |  |  |
| Heat Shrinkage Percentage (%) | 1.2 | 1.5 | 1.5 | 1.5 | 1.5 | 5 | 0.5 | 1.2 | 1.2 |
| Adhesive Content per unit area (%) | 3 | 7 | 3 | 3 | 4 | 3 | 8 | 8 | 0 |
| Adhesive Strength (kg/5 yarns) | 3 | 3 | 3 | 3 | 4 | 3 | 4 | 5 | 0 |
| Productivity |  |  |  |  |  |  |  |  |  |
| Less generation of Foreign Substance | G | P | E | P | G | G | G | G | G |
| Productivity of Short Fibers | G | G | G | G | G | G | G | G | G |
| Uniformity in Length of Short Fibers | G | G | P | E | G | G | G | G | P |
| Property of Belt |  |  |  |  |  |  |  |  |  |
| Dispersibility in Rubber | E | P | E | E | P | E | P | P | P |
| Abrasion Resistance | 100 | 80 | 100 | 100 | 90 | 50 | 90 | 80 | 50 |
| Flexibility | 100 | 50 | 100 | 100 | 80 | 80 | 70 | 75 | 50 |

Note G: good, P: poor, E: excellent

TABLE 2

| | (phr) |
|---|---|
| Composition of Compression Rubber Layer | |
| CR | 100 |
| Stearic Acid | 2 |
| MgO | 4 |
| Antioxidant | 2 |
| Plasticizer | 8 |
| Carbon Black N550 | 36 |
| Nylon Cut Fiber | 20 |
| Vulcanization Accelerator | 0.5 |
| ZnO | 5 |
| Sulfur | 1 |
| Physical Properties of Compression Rubber layer | |
| Direction parallel with grain 10% Modulus (kg/cm$^2$) | 97 |
| Direction orthogonal to grain Elongation (%) | 300 |
| Elongation (%) after heat-treated at 120° C. for 10 days | 250 |

As is evident from data of Table 1, a cord fabric 1 of the example of the present invention is good in both of physical properties and workabilities. Short fibers 4 produced from the above cord fabric 1 have excellent dispersibility into rubber. A V-ribbed belt A formed of the rubber is excellent in both of abrasion resistance and flex fatigue resistance.

On the other hand, in Comparative example 1, since a warp yarn 2 forming a cord fabric 1 is formed of a spun yarn, short fibers 4 formed by cutting the cord fabric 1 have variations in length. In addition, since the spun yarn is primary-twisted and final-twisted, the twist is stronger than that of the warp yarn formed of a multi-filament yarn. Accordingly, the short fibers 4 is poor in dispersibility into rubber. The reason for this poor dispersibility is that the number of twistings of the warp yarn 2 is as many as 36 times in every 10 cm. As a result, a V-ribbed belt A formed by the rubber into which the short fibers 4 are mixed is poor in abrasion resistance and flex fatigue resistance as compared with the example of the present invention. Likewise, in Comparative example 4, since the number of twistings of warp yarn 2 is as many as 10 times in every 10 cm which is second to Comparative example 1, there is the same tendency.

In Comparative example 2, since the count of weft yarns 3 is as small as 0.5 yarns in every 5 cm, this makes the workability of forming a cord fabric 1 poor. On the contrary, in Comparative example 3, the count of weft yarns 3 is as many as 10 yarns in every 5 cm. Whereas this makes the workability of forming a cord fabric excellent, many weft yarns 3 cannot be cut in a short length at the cutting of the cord fabric to remain long so that cracks can generate in the resulting V-ribbed belt A.

In Comparative example 5, a heat shrinkage percentage of the warp yarn 2 is as large as 5% so that the resulting V-ribbed belt A has poor abrasion resistance. One reason for this is that if a compression rubber layer 8 of the V-ribbed belt A is formed of rubber mixed with short fibers 4 having a large heat shrinkage percentage, the short fibers are shrunk due to heat generation and an ambient temperature (70° to 120° C.) at the belt run so that the degree of exposure of the short fibers 4 on the belt side is abruptly decreased, thereby accelerating the abrasion of the V-ribbed belt A and resulting in a shortened belt life. The other reason is that displacements generate at the interfaces between the rubber and the short fibers so that the displacements may become starting points of cracks at the belt run. On the contrary, in Comparative example 6, since a heat shrinkage percentage of the warp yarn 2 is as small as 0.5%, this makes the heat-treatment workability of a cord fabric 1 poor.

Further, in both Comparative examples 6 and 7, an adhesive content per unit area of a cord fabric 1 is as large as 8%. Also, in Comparative example 1, an adhesive content per unit area of a cord fabric 1 is as large as 7% which is second to the above Comparative examples. Accordingly, in these Comparative examples, warp yarns 2 are difficult to separate so that short fibers 4 obtained by cutting the warp yarns 2 have poor dispersibility into rubber. Accordingly, the resulting V-ribbed belts A are poor in abrasion resistance and flex fatigue resistance. On the other hand, in Comparative example 8, an adhesive content of a cord fabric 1 per unit area is 0%. Accordingly cut short fibers 4 have many variations in length due to displacement at the cutting of the cord fabric 1, and the short fibers 4 are collected in rubber thereby having poor dispersibility.

In the case of forming short fibers from only warp yarns, not only the warp yarns become unstable when they are cut thereby resulting in the poor productivity of short fibers, but also cut fibers have many variations in length.

We claim:

1. A method of producing short fibers, comprising the steps of:

subjecting a multi-filament yarn to 4 to 9 twists every 10 cm in a single direction thereby forming a warp yarn;

passing weft yarns crosswise over and under a plurality of the warp yarns with the plural warp yarns parallel-arranged thereby forming a cord fabric; and subjecting the cord fabric to adhesion treatment with an adhesive and to heat treatment to heat shrink the warp yarns and then cutting the cord fabric thereby obtaining short fibers.

2. A method of producing short fibers according to claim 1, wherein the short fibers are rubber-reinforcing short fibers which are mixed into rubber to reinforce the rubber.

3. A method of producing short fibers according to claim 2, wherein the count of the weft yarns of the cord fabric is 1 to 3 yarns in every 5 cm, the adhesive content per unit area of the treated cord fabric is 2 to 5%, and the heat shrinkage percentage of the warp yarns is 1 to 4%.

4. A method of producing short fibers according to claim 3, wherein the adhesion treatment of the cord fabric is dip treatment in which the cord fabric is dipped into a mixed solution of a resorcine-formaldehyde precondensate and rubber latex.

5. A method of producing short fibers according to claim 3, wherein the cord fabric after subjection to adhesion treatment is rolled in the form of a cylinder and is then cut at set lengths by a cutter.

* * * * *